United States Patent [19]

Cornell et al.

[11] 4,175,628

[45] Nov. 27, 1979

[54] STEERING CONTROL SYSTEM FOR DUAL PATH HYDROSTATIC VEHICLE

[75] Inventors: Charles R. Cornell, Battle Creek, Mich.; Dennis D. Simpson, Spencer, Iowa

[73] Assignee: Eaton Corporation, Cleveland, Ohio

[21] Appl. No.: 922,939

[22] Filed: Jul. 10, 1978

[51] Int. Cl.² .................. B62D 11/04; F15B 18/00; F16H 39/46; B60K 23/00

[52] U.S. Cl. .................. 180/6.48; 60/395; 60/420; 60/486; 180/77 H

[58] Field of Search ......... 180/6.48, 77 H; 60/395, 60/420, 484, 486

[56] References Cited

U.S. PATENT DOCUMENTS

| | | | |
|---|---|---|---|
| 3,848,690 | 11/1974 | Hawkins | 180/6.48 |
| 3,876,020 | 4/1975 | Barsby | 180/77 H |
| 3,914,938 | 10/1975 | Cornell et al. | 180/6.48 |

*Primary Examiner*—Joseph F. Peters, Jr.
*Assistant Examiner*—Donn McGiehan

*Attorney, Agent, or Firm*—R. J. McCloskey; J. Yakimow; L. Kasper

[57] ABSTRACT

A steering control system is disclosed for use on a dual path, hydrostatic drive vehicle. The steering control system includes a steering signal generator, the steering signal representing commanded steering ratio and direction. The system senses vehicle direction and steering direction and generates an electrical switch signal having a first or second condition, depending upon which transmission must have its speed reduced to achieve the desired vehicle orientation. The steering signal and the main speed command signal are multiplied to generate a speed modification signal and an electrical switch transmits the modification signal to one transmission or the other depending upon whether the switch signal is in the first or second condition. The disclosed steering system permits use of a T-handle control, for both speed and steering, such that vehicle orientation may be maintained generally perpendicular to handle orientation for both forward and reverse vehicle travel.

8 Claims, 5 Drawing Figures

STEERING CONTROL SYSTEM FOR DUAL PATH HYDROSTATIC VEHICLE

BACKGROUND OF THE DISCLOSURE

The present invention relates generally to hydrostatic transmission control systems, and more particularly, to an electrical steering control system for a dual path hydrostatic drive vehicle.

The use of hydrostatic transmissions to drive off-highway vehicles has become increasingly popular for many reasons, such as the ability to infinitely vary the speed ratio. A somewhat unique application is the use of a pair of hydrostatic transmissions to drive a dual path (or dual track) vehicle, such as a crawler tractor.

In dual path hydrostatic drive systems, it is necessary to precisely match the speeds of the two transmissions to accomplish "straight tracking", and to be able to modify the speed of either transmission, relative to the other, to effect steering of the vehicle. Control systems for dual path hydrostatic drive systems were originally hydraulic, but more recently, as the controls have become more complex, an increasing portion of the control logic has been accomplished electrically. An example of such a control system is illustrated in U.S. Pat. No. 3,914,938, assigned to the assignee of the present invention.

In the prior art electrical steering control systems for dual path vehicles, it has been typical to use the speed command signal for excitation of the steering signal generator, effectively multiplying the steering command and the speed command to provide an output signal having a gain dependent upon the speed command. As a result, there is no signal available, as an input to the system logic, which actually indicates the desired or commanded "steering ratio", i.e., the relationship of the speeds of the two tracks.

Accordingly, it is an object of the present invention to provide an electrical steering control system for a dual path vehicle in which the steering input results in the generation of a steering signal representative of the commanded steering ratio, uneffected by instantaneous vehicle speed, such that the commanded steering ratio is available as an input to the subsequent system logic.

Typically, dual track vehicles are operated in reverse a substantial portion of the total operating time. Therefore, it is important that such vehicles be easy to steer during both forward and reverse operation. Conventionally, the steering of dual track vehicles has been accomplished either by a pair of steering inputs (as in U.S. Pat. No. 3,914,938), such as a pair of foot pedals, or by a single steering input (as in U.S. Pat. No. 3,848,690), such as the well known joy-stick. In either case, it has been generally acceptable, for example, for right-hand steering actuation (depressing the right foot pedal or moving the joy-stick to the right) to result in slowing the hydrostatic transmission driving the right track, whether the vehicle is moving in the forward direction or in the reverse direction.

On many dual path vehicles, T-handle control is preferred because it is simpler to operate than the systems which have a single control for speed and a pair of foot pedals for steering. T-handle control is also preferred over a joy-stick in many applications where the rough terrain over which the vehicle travels makes it difficult to control the joy-stick. However, the prior art electrical steering control systems for dual path vehicles are unsatisfactory for use with T-handle controls, because rotation of the T-handle in one direction will always reduce the speed of the transmission driving the right track, while rotation of the T-handle in the other direction will always reduce the speed of the transmission driving the left track.

Accordingly, it is an object of the present invention to provide an electrical steering control system for dual path vehicles capable of being used with T-handle controls, such that the vehicle may travel generally perpendicular to the T-handle orientation for both forward and reverse directions of vehicle operation.

SUMMARY OF THE INVENTION

The above and other objects of the present invention are accomplished by the provision of an improved steering control system including means for generating a steering signal representative of the commanded steering ratio and steering direction. The system includes means for electrically sensing vehicle direction and commanded steering direction and generating an electrical switch signal having a first condition when it is necessary to modify the speed of one of the transmissions, and a second condition when it is necessary to modify the speed of the other transmission. Electrical multiplying means are included for multiplying the steering signal and the speed command signal to generate a speed modification signal representative of the change in speed of one of the transmissions which is needed to achieve the commanded steering ratio. The system further includes electrical switching means operable to transmit the speed modification signal to the control means for one transmission when the switch signal is in the first condition and to transmit the speed modification signal to the control means for the other transmission when the switch signal is in the second condition.

In accordance with another aspect of the present invention, the steering signal is shaped, prior to it being multiplied by the speed command signal, to provide minimum gain near neutral and maximum gain at maximum steering command. Preferably, this is accomplished by electrically squaring the steering signal.

BRIEF DESCRIPTION OF THE DRAWINGS

FIG. 5($a$), 5($b$), 5($c$), and 5($d$) is a series of vector diagrams illustrating the correlation between T-handle position and the relative speeds of the left and right tracks.

DESCRIPTION OF THE PREFERRED EMBODIMENT

Figure 1:
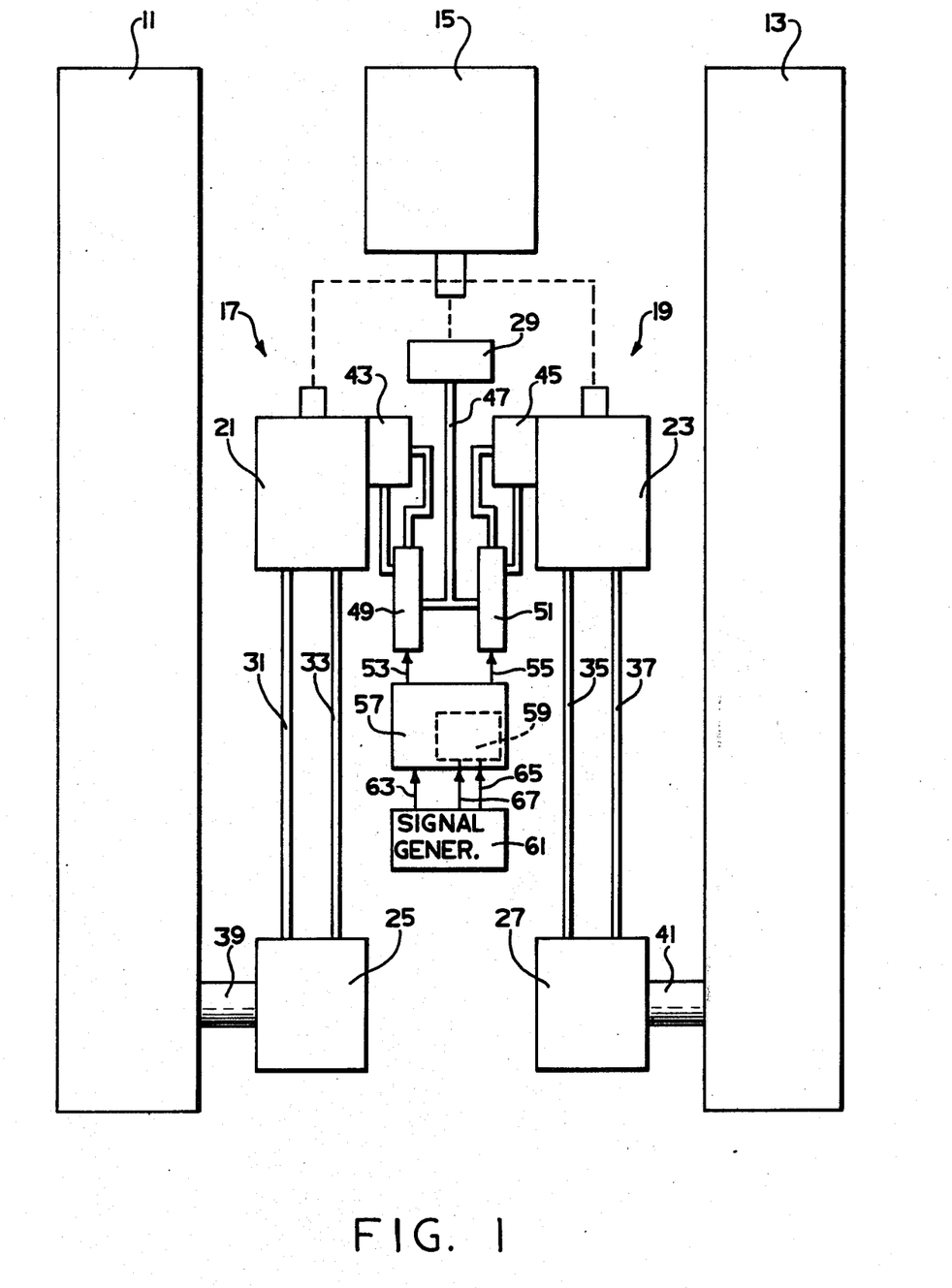
FIG. 1 is a somewhat schematic illustration of a control system for a pair of hydrostatic transmissions used to drive the tracks of a crawler tractor.

Referring now to the drawings, which are not intended to limit the invention, FIG. 1 illustrates a control system for a pair of hydrostatic transmissions being used to drive the tracks of a crawler tractor. It should be understood, however, that the present invention is not limited to use with tracked vehicles, but may be used in any type of control system for a plurality of hydrostatic transmissions in which it is necessary to vary the speed of one of the transmissions relative to the speed of the others.

The crawler tractor of FIG. 1 includes a pair of tracks 11 and 13 which are driven by an engine 15 through a pair of hydrostatic transmissions, generally designated 17 and 19. The hydrostatic transmissions 17 and 19 include variable displacement pump units 21 and 23, and fixed displacement motor units 25 and 27. The pump units 21 and 23 are driven by the engine through a gear box (not shown), through which a charge pump 29 is also driven.

The pump unit 21 is connected through a pair of fluid conduits 31 and 33 to the motor unit 25, and similarly, the pump unit 23 is connected through a pair of conduits 35 and 37 to the motor unit 27. The motor unit 25 drives the track 11 by means of a drive shaft 39, and the motor unit 27 drives the track 13 by means of a drive shaft 41.

The displacements of the pump units 21 and 23 are controlled by a pair of hydraulic actuators 43 and 45, to achieve any desired speed ratio of each of the transmissions 17 and 19, in either forward or reverse operation. Preferably, the pump units 21 and 23 are of the axial piston type and have swashplates which are movable from a neutral position (zero displacement) toward maximum displacement in either direction.

Operation of the hydraulic actuators 43 and 45 to vary the speed ratios and direction of operation of the transmissions 17 and 19 is accomplished by means of control pressure fluid communicated from the charge pump 29 through a fluid conduit 47 to a pair of electrohydraulic valves 49 and 51, which are in fluid communication with the hydraulic actuators 43 and 45, respectively. The hydraulic actuators 43 and 45 and the electro-hydraulic valves 49 and 51 may be of the type generally well known in the art. Briefly, the electrohydraulic valves 49 and 51 are operable to port control fluid to the actuators 43 and 45, in one direction or the other, in response to variations in a pair of electrical command signals 53 and 55. As is well known to those skilled in the art, the hydrostatic transmissions 17 and 19 are preferably identical such that, during normal straight ahead operation (straight tracking) of the vehicle, the electrical command signals 53 and 55 are identical, and the speed ratios of the transmissions 17 and 19 are identical.

The electrical command signals 53 and 55 are transmitted to the electro-hydraulic valves 49 and 51 from a main electrical control system 57, including a steering control system 59. The control systems 57 and 59 receive their inputs from a signal generator 61, the inputs including an electrical speed command signal 63 and a pair of electrical steering signals 65 and 67.

Figure 2:
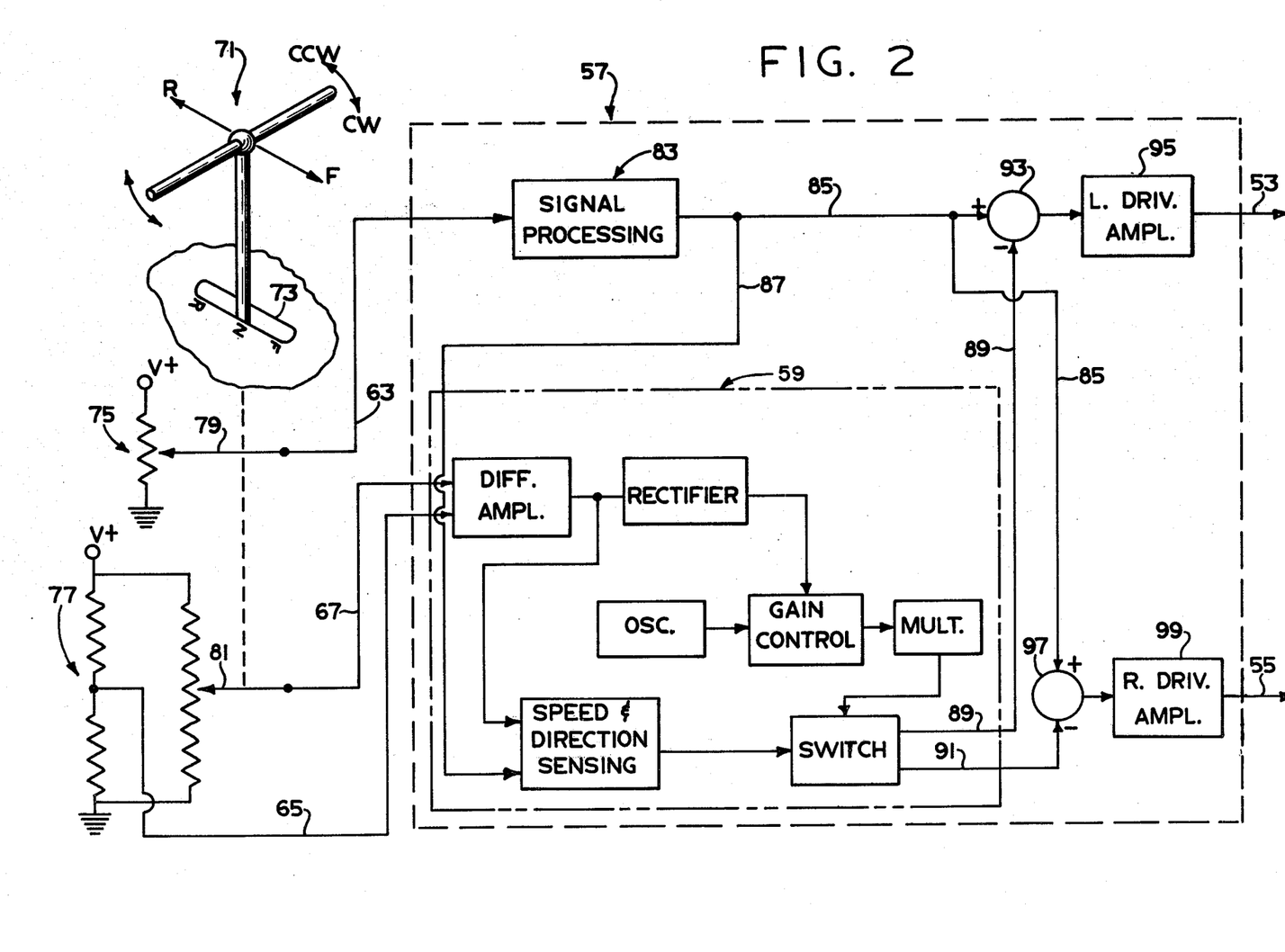
FIG. 2 is an illustration, partly schematic and partly in block diagram, of the electrical control system shown in FIG. 1, including the steering control system of the present invention.

Referring now to FIG. 2, the main electrical control system 57 and the steering control system 59 will be described in general. The electrical speed command signal 63 and the electrical steering signals 65 and 67 are generated at the signal generator 61 in response to the position of a T-handle control, generally designated 71. The T-handle control 71, shown in its neutral position in FIG. 2, can be used to control the speed and direction of the vehicle by movement away from the neutral position, in either the forward or reverse direction, within a guide slot 73. At the same time, the T-handle is used to steer the vehicle (i.e., determine the "orientation" of the vehicle, as will be described in greater detail subsequently) by rotation of the T-handle 71 in either the clockwise (cw) or counterclockwise (ccw) direction.

As is shown schematically in FIG. 2, the position of the T-handle 71 controls the output of the signal generator 61, which includes a command signal generator 75 and a steering signal generator 77. The command signal generator 75 includes an adjustable wiper 79, which moves in response to movement of the T-handle 71, either forward or reverse. The wiper 79 is connected to a lead which transmits the speed command signal 63 to the control system 57.

The steering signal generator 77 includes an adjustable wiper 81 which is movable in response to rotation of the T-handle 71. The wiper 81 is connected to a lead which transmits the steering signal 67 to the steering control system 59, while another lead transmits the steering signal 65 as a reference signal to the steering control system 59.

The speed command signal 63 is transmitted to signal processing circuitry, generally designated 83. The circuitry 83 is generally well known in the art and may include such functions as signal shaping (low gain near neutral and higher gain away from neutral), rate or acceleration limiting, and anti-stall control. The "processed" speed command signal is transmitted by a lead 85 to the "downstream" circuitry which will be described subsequently. A lead 87 is connected to the lead 85 and transmits the processed speed control signal to the steering control system 59.

The block diagram version of the steering control system 59 will not be described in connection with FIG. 2, but may be referred to in conjunction with the description of the circuitry in FIGS. 3 and 4. Referring still to FIG. 2, the outputs from the steering control system 59 comprise a pair of speed modification signals 89 and 91. When straight tracking is desired, the speed modification signals 89 and 91 will both be at a voltage level equal to a command signal voltage representative of zero vehicle speed (in the subject embodiment, a reference voltage $V_R$). Straight tracking requires that the wiper 81 be centrally positioned on the associated resistance of the steering signal generator 77. Movement of the wiper 81 from the central position in one direction will result in the speed modification signal 89 being different than $V_R$, and movement of the wiper 81 in the other direction will cause the speed modification signal 91 to differ from $V_R$.

The speed modification signal 89 and the speed command signal 85 are summed at a junction 93, the output of which is fed to a left driving amplifier 95, which generates the command signal 53. Similarly, the speed modification signal 91 and the command signal 85 are summed at a junction 97, the output of which is fed to a right driving amplifier 99, which generates the command signal 55.

Figure 3:
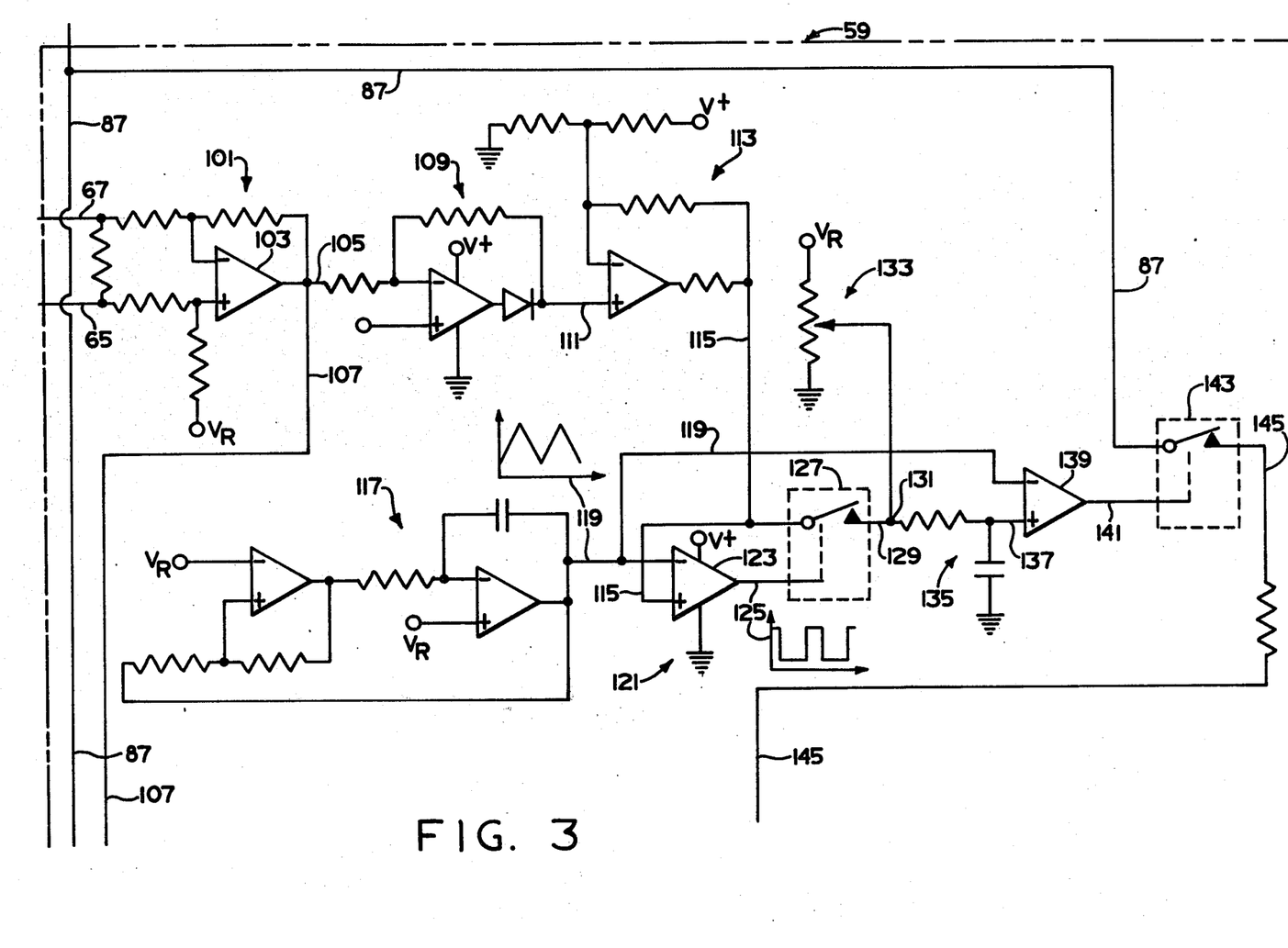
FIGS. 3 and 4 are schematic illustrations of a preferred embodiment of the electrical control circuitry used in the steering control system.
Figure 4:
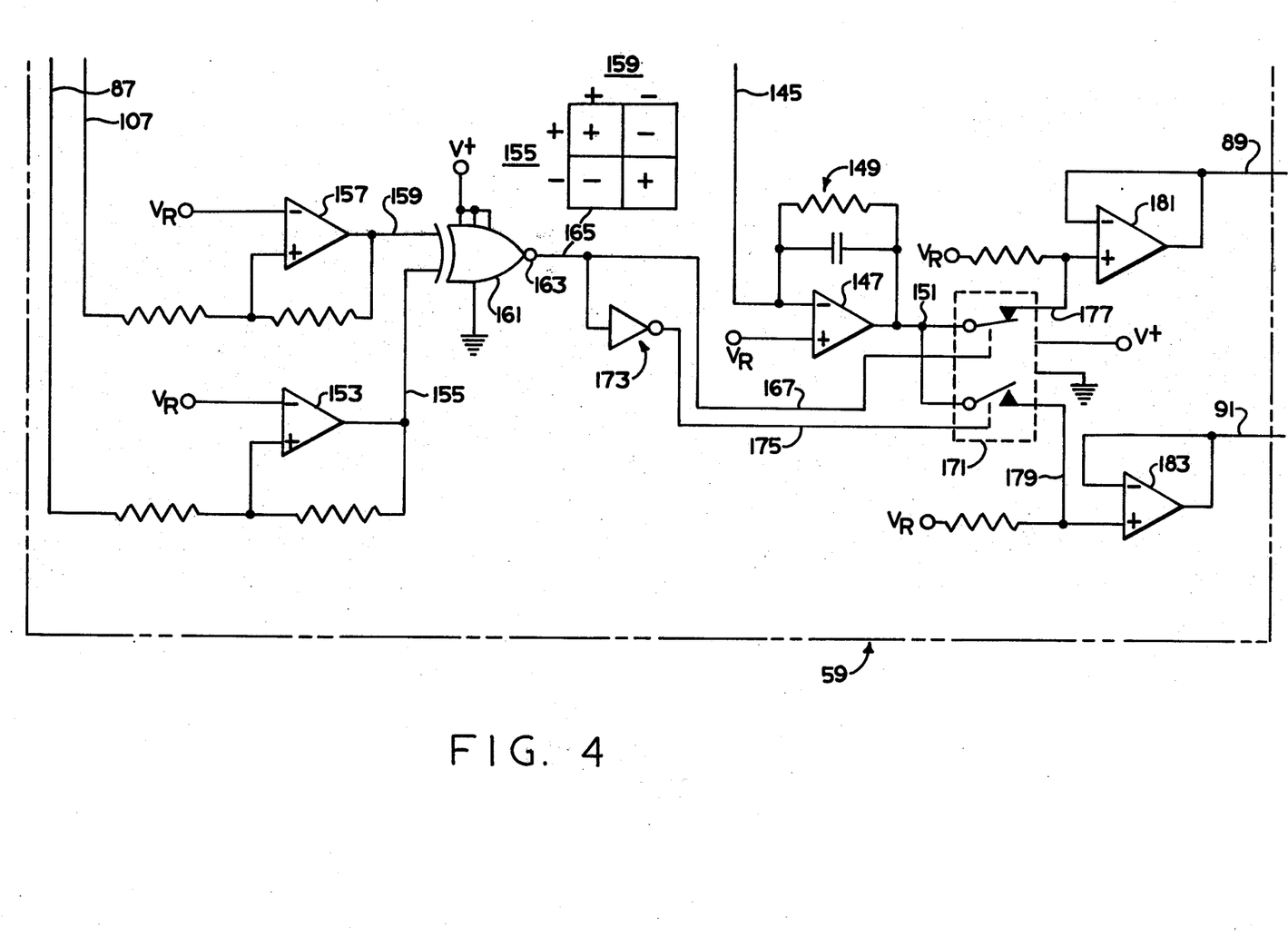

Referring now to FIGS. 3 and 4, a preferred embodiment of the steering control system 59 will be described in detail. For ease of description of the circuitry, reference to each of the signals in the circuit will be made in terms of the reference numeral used to identify the lead over which the particular signal is being transmitted.

The steering signals 65 and 67 are transmitted to a differential amplifier circuit, generally designated 101, including an operational amplifier 103, which transmits its output to a pair of leads 105 and 107. In the subject embodiment, counterclockwise rotation of the T-handle 71 moves the wiper 81 upward (in FIG. 2), such that steering signal 67 is greater than $V_R$. However, the signal 67 is transmitted to the inverting terminal of the amplifier 103, such that the signals 105 and 107 are negative (i.e., below $V_R$), an assumed condition upon which the subsequent description will be based. Thus, the signals 105 and 107 indicate the commanded steering direction or orientation of the vehicle, and have a magnitude representative of the commanded steering ratio.

The signal 105 is transmitted to a rectifier circuit, generally designated 109, the output of which is connected to a lead 111, such that the magnitude of the signal 111 is equal to the magnitude of the signal 105, but the signal 111 is always positive. The rectified signal 111 is transmitted to a voltage amplifier circuit, generally designated 113, the output of which is connected to a lead 115.

In FIG. 3, shown just below the previously described circuits is an oscillator circuit, generally designated 117, the output of which is connected to a lead 119. Oscillator circuits are well known in the art, and the signal 119 is a saw toothed or triangular wave signal (as illustrated), with the amplitude of the signal 119 preferably being equal to the range of magnitudes of the signal 115, for reasons which will become apparent. The oscillating signal 119 is transmitted to a squaring circuit, or gain control circuit generally designated 121. The signal 119 goes to the inverting terminal of a comparator 123, while the amplified steering signal 115 is transmitted to the noninverting terminal of the comparator 123. The output of the comparator 123 is transmitted by means of a lead 125, with the signal 125 being a square wave which goes to positive saturation when the steering signal 115 is greater than the oscillating signal 119, and goes to negative saturation when the steering signal 115 is less than the oscillating signal 119. Therefore, because the frequency of the oscillating signal 119 is fixed, the duty cycle of the square wave signal 125 (i.e., the percent of cycle time spent at positive saturation) is directly proportional to the desired steering ratio. For example, the circuit components should preferably be selected such that, during straight tracking (infinite steering radius), the steering signal 115 is approximately equal to the minimum value of the oscillating signal 119 to produce a signal 125 having a duty cycle of 0%. For maximum displacement of the wiper 81 (maximum steering ratio), the steering signal 115 is approximately equal to the maximum value of the oscillating signal 119 to to produce a signal 125 having a duty cycle of 100%.

The square wave signal 125 is transmitted to an electronic switch 127, having an output lead 129 connected to a summing junction 131. The other input to the switch 127 is the steering signal 115, such that the steering signal 115 is transmitted to the lead 129 and to the junction 131 when the square wave signal 125 is at positive saturation. When the signal 125 is at negative saturation (as shown in FIG. 3), the lead 129 is not connected to the steering signal 115, and the level of the signal 131 is determined by the setting of an adjustment potentiometer, generally designated 133. Accordingly, the signal 131 is also a square wave having a duty cycle equal to the duty cycle of the signal 125, a magnitude in the "on" condition equal to the steering signal 115, and a magnitude in the "off" condition equal to the signal from the potentiometer 133. The junction 131 is connected to a filter circuit, generally designated 135, which filters the square wave signal 131 to produce on its output lead 137 a DC signal having a magnitude proportional to the square of the steering signal 115. Therefore, the squaring circuit 121 performs a shaping or gain control function on the raw steering signal 115.

The DC signal 137, representing the square of the commanded steering ratio, is transmitted to the noninverting terminal of a comparator 139. The input to the inverting terminal of the comparator 139 is the oscillating signal 119. The output of the comparator 139 is transmitted by means of a lead 141, such that the signal 141 is a square wave which goes to positive saturation when the signal 137 is greater than the oscillating signal 119 and to negative saturation when the signal 137 is less than the oscillating signal 119. The result is that the duty cycle of the signal 141 is directly proportional to the square of the commanded steering ratio. The square wave signal 141 is transmitted to an electronic switch 143, which has an output lead 145. The other input to the switch 143 is the processed speed control signal 87. When the square wave signal 141 is at positive saturation, the speed control signal 87 is transmitted to the lead 145, and when the signal 141 is at negative saturation, the lead 145 is isolated from the speed control signal 87. Thus, the signal 145 is a square wave which has a magnitude in the "on" condition equal to that of the speed control signal 87, and a duty cycle proportional to the square of the commanded steering ratio.

Referring now to FIG. 4, the square wave signal 145 is transmitted to the inverting terminal of an operational amplifier 147, which is a part of a filter circuit, generally designated 149. The input to the noninverting terminal of the amplifier 147 is the reference voltage $V_R$. The output of the filter circuit 149 is transmitted to a summing junction 151, such that the signal 151 is a DC signal having a magnitude proportional to the product of the speed control signal 87 and the square of the steering signal 115. The signal 151 is hereinafter referred to as a speed modification signal, because it represents a change in the speed of one of the transmissions 17 or 19 which is necessary to achieve the commanded steering ratio.

The speed control signal 87 is transmitted to the noninverting terminal of a comparator 153, with the input to the inverting terminal being the reference voltage $V_R$. The output of the comparator 153 is a DC signal 155 whose only function is to indicate direction of movement of the vehicle. For example, with the vehicle moving in a forward direction, the speed control signal 87 is below $V_R$, such that the signal 155 is negative.

At the same time, the signal 107 is transmitted to the noninverting terminal of a comparator 157, with the inverting terminal again being connected to the reference voltage $V_R$. The output of the comparator 157 is a DC signal 149 whose only function is to indicate direction of rotation of the T-handle 71, and therefore, desired orientation of the vehicle, as will be described in connection with FIG. 5. With the signal 107 previously having been assumed to be negative (relative to $V_R$), the DC signal 159 will also be negative.

Accordingly, the comparators 153 and 157 provide signals 155 and 159, respectively, which represents the vehicle direction and commanded steering direction, respectively. The inputs assumed for purposes of this description (i.e., forward travel of the vehicle and counterclockwise rotation of the T-handle 71) may be seen to correspond to the schematic illustration of FIG. 5(a). FIG. 5 will be referred to again subsequently.

Referring again to FIG. 4, the signals 155 and 159, both of which are negative, are transmitted to the input terminals of an exclusive OR gate 161, having its output connected to an inverter 163 which is connected to a lead 165. As may be seen from the table associated with the signal 165, when the signals 155 and 159 are both negative, the signal 165 is positive. It should be understood that the present invention is not limited to the combination of the exclusive OR gate 161 and the inverter 163, but various other gate and logic combinations may be utilized to obtain any desired relationship between the signals 155 and 159 and the signal 165.

The signal 165 is transmitted by a lead 167 to one "pole" of an electronic switch 171, while the signal 165 is connected to an inverter 173, then transmitted by a lead 175 to the other "pole" of the electronic switch 171. Therefore, with the signal 165 being positive, the signal 167 is positive and the signal 175 is negative. The input to each of the "poles" of the electronic switch 71 is the speed modification signal 151, and the switch 171 has output leads 177 and 179, which are connected to summing junctions, which in turn are connected to the noninverting terminals of operational amplifiers 181 and 183, respectively.

As is shown in FIG. 4, when the signal 167 is positive, the speed modification signal 151 is transmitted to the output lead 177, while the output lead 179 is isolated from the speed modification signal 151, because the signal 175 is negative. Therefore, in the condition illustrated in FIG. 4, the speed modification signal 151 is transmitted to the amplifier 181 to produce a positive speed modification signal 89, while only $V_R$ is transmitted to the amplifier 183, producing a speed modification signal 91 which is at zero. Referring again to FIGS. 2 and 5(a), it may be seen that the electrical command signal 53, which determines the speed of the track 11, is proportional to the processed speed control signal 85 minus the speed modification signal 89, while the command signal 55, which determines the speed of the right track 13, is proportional to the speed control signal 85 minus the speed modification signal 91. However, under the assumed position of the T-handle control 71, the speed modification signal 91 corresponds to a zero speed command, such that the command signal 55 is proportional to the speed control signal 85.

Figure 5A:
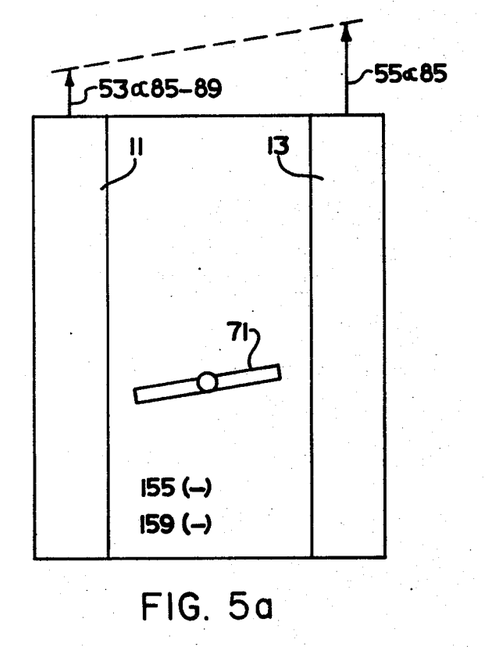

In FIG. 5(a), it may be seen that the steering operation results in a direction of vehicle travel which is generally perpendicular to the orientation of the T-handle 71. As was mentioned in connection with the description of the generation of the signal 165, it is within the scope of the present invention to include circuit logic which will provide any desired correlation between the position of the T-handle 71 and the orientations of the vehicle. However, one object of the subject embodiment of the invention is to provide a steering control system in which the orientation of the vehicle (i.e., direction of vehicle travel) is generally perpendicular to the T-handle, for both forward and reverse travel of the vehicle.

Figure 5B:
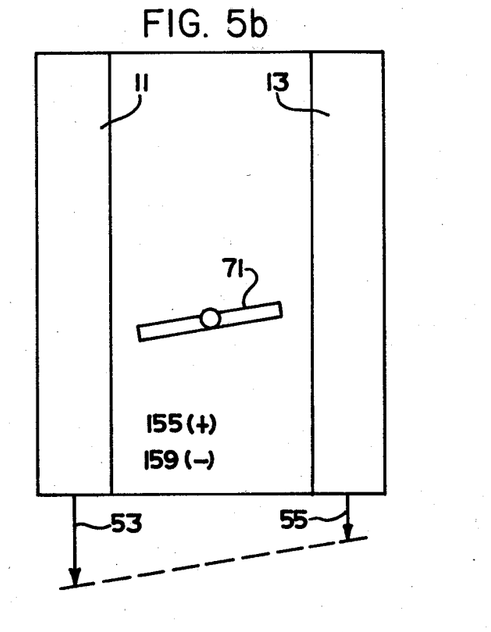
Figure 5C:
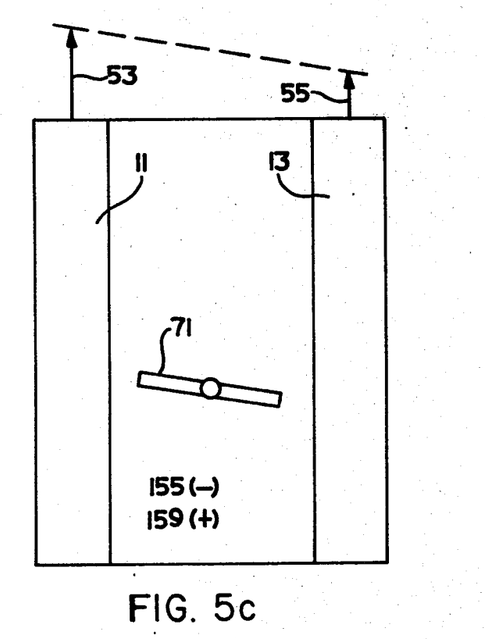

Referring now to FIG. 5(b), in conjunction with FIG. 4, it may be seen that for reverse direction of travel of the vehicle, the signal 155 is now positive, but with the T-handle 71 still turned counterclockwise, the signal 159 is still negative. From the table associated with the signal 165, it may be seen that the signal 165 is now negative, while the signal 167 is negative and the signal 175 is positive. Thus, the speed modification signal 151 is transmitted to the amplifier 183 and the command signal 55 is proportional to the speed control signal 85 minus the modification signal 91, while the command signal 53 is proportional to the speed control signal 85. A similar analysis of FIG. 5(c) shows that for forward operation of the vehicle the signal 155 is negative, and with clockwise rotation of the T-handle 71, the signal 159 is positive, such that the signal 165 is negative (as was the case in FIG. 5(b)). Therefore, the command signal 53 is again proportional to the speed control signal 85, while the command signal 55 is proportional to the control signal 85 minus the speed modification signal 91.

Figure 5D:
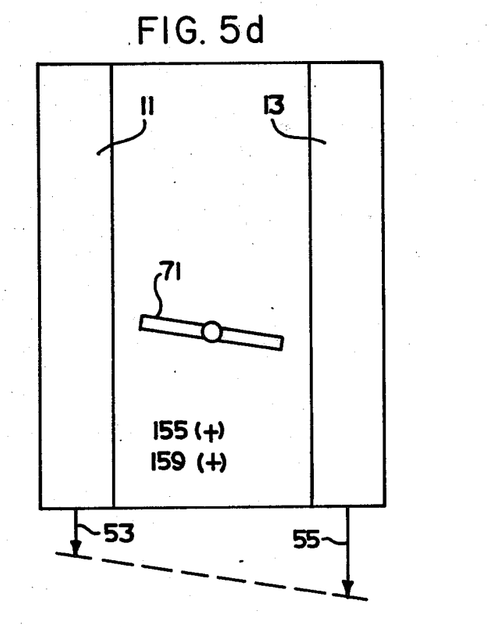

In FIG. 5(d), with the vehicle again traveling in reverse, the signal 155 is positive, and with the T-handle 71 still turned clockwise, the signal 159 is still positive. The signal 165 is positive (as in FIG. 5(a)), so that the command signal 53 is again proportional to the speed control signal 85 minus the speed modification signal 89, while the command signal 55 is proportional to the control signal 85.

What is claimed is:

1. A steering control system for a vehicle having first and second hydrostatic transmissions, each of said transmissions including a fluid pump unit and a fluid motor unit, one of said units being variable displacement, the vehicle further having a main control system including means for generating a command signal representative of the desired vehicle speed and vehicle direction, and first and second control means operable in response to changes in the command signal to vary the displacement of the variable displacement unit of the first and second transmissions, respectively, the steering control system comprising:
    (a) means for generating a steering signal representative of the commanded steering ratio and steering direction;
    (b) means for electrically sensing vehicle direction and commanded steering direction and generating an electrical switch signal having a first condition when it is necessary to modify the speed of the first transmission to achieve the desired orientation, and having a second condition when it is necessary to modify the speed of the second transmission to achieve the desired vehicle orientation;
    (c) means for electrically multiplying said steering signal and the command signal to generate a speed modification signal representative of the change in speed of one of the first and second transmissions necessary to achieve the commanded steering ratio; and
    (d) electrical switching means operable to transmit said speed modification signal to the first control means in response to said switch signal being in said first condition and to transmit said speed modification signal to the second control means in response to said switch signal being in said second condition.

2. A steering control system as claimed in claim 1 wherein said means for generating a steering signal includes rotatable handle means oriented generally perpendicular to the vehicle axis during straight tracking, and said means for generating an electrical switch signal is operable to maintain the orientation of the vehicle generally perpendicular to the orientation of said handle means.

3. A steering control system as claimed in claim 1 including means for shaping said steering signal whereby said steering signal has a relatively lower gain near steering neutral and a relatively higher gain toward maximum steering ratio.

4. A steering control system as claimed in claim 3 wherein said shaping means comprises circuit means operable to provide a shaped steering signal proportional to the square of the generated steering signal.

5. A steering control system as claimed in claim 1 wherein said sensing means provides one signal having a first condition representing forward vehicle direction or a second condition representing rearward vehicle direction and another signal having a first condition representing a first steering direction or a second condition representing a second steering direction.

6. A steering control system as claimed in claim 5 wherein said means for generating an electrical switch signal includes logic gate means, the inputs to said gate means comprising said one signal and said another signal, and the output of said gate means comprising said electrical switch signal.

7. A steering control system as claimed in claim 6 wherein said electrical switch signal is in said first condition when said one signal and said another signal are in the same condition and said electrical switch signal is in said second condition when said one signal and said another signal are in different conditions.

8. A steering control system for a vehicle having first and second hydrostatic transmissions, each of said transmissions including a fluid pump unit and a fluid motor unit, one of said units being variable displacement, the vehicle further having a main control system including means for generating a command signal representative of the desired vehicle speed and vehicle direction, and first and second control means operable in response to changes in the command signal to vary the displacement of the variable displacement unit of the first and second transmissions, respectively, the steering control system comprising:

(a) means for generating a steering signal representative of the desired steering ratio and steering direction;

(b) means for electrically sensing vehicle direction and desired steering direction and generating an electrical switch signal having a first condition when a first orientation is desired and a second condition when a second orientation is desired;

(c) means for electrically multiplying said steering signal and the command signal to generate a speed modification signal representative of the change in speed of one of the first and second transmissions necessary to achieve said desired steering ratio; and (d) electrical switching means operable to transmit said speed modification signal to the first control means in response to said switch signal being in said first condition and to transmit said speed modification signal to the second control means in response to said switch signal being in said second condition.

* * * * *